(12) United States Patent
Kaxiras et al.

(10) Patent No.: US 9,274,960 B2
(45) Date of Patent: Mar. 1, 2016

(54) SYSTEM AND METHOD FOR SIMPLIFYING CACHE COHERENCE USING MULTIPLE WRITE POLICIES

(71) Applicants: Stefanos Kaxiras, Uppsala (SE); Alberto Ros, Cartagena (ES)

(72) Inventors: Stefanos Kaxiras, Uppsala (SE); Alberto Ros, Cartagena (ES)

( * ) Notice: Subject to any disclaimer, the term of this patent is extended or adjusted under 35 U.S.C. 154(b) by 300 days.

(21) Appl. No.: 13/793,521

(22) Filed: Mar. 11, 2013

(65) Prior Publication Data

US 2013/0254488 A1 Sep. 26, 2013

Related U.S. Application Data

(60) Provisional application No. 61/613,080, filed on Mar. 20, 2012.

(51) Int. Cl.
*G06F 12/00* (2006.01)
*G06F 12/08* (2006.01)

(52) U.S. Cl.
CPC .......... *G06F 12/0815* (2013.01); *G06F 12/084* (2013.01); *G06F 12/0811* (2013.01); *G06F 12/0837* (2013.01); *Y02B 60/1225* (2013.01)

(58) Field of Classification Search
CPC G06F 12/0815; G06F 12/0811; G06F 12/084
See application file for complete search history.

(56) References Cited

U.S. PATENT DOCUMENTS

| 5,303,362 | A * | 4/1994 | Butts et al. ................. 711/121 |
| 7,069,361 | B2 | 6/2006 | Owen et al. |
| 7,624,236 | B2 * | 11/2009 | Chrysos et al. ............... 711/147 |
| 2004/0039880 | A1 * | 2/2004 | Pentkovski et al. ........... 711/146 |
| 2005/0102473 | A1 | 5/2005 | Sakata et al. |
| 2009/0216957 | A1 * | 8/2009 | Chaussade et al. ........... 711/141 |
| 2011/0161596 | A1 | 6/2011 | Conte |
| 2011/0231612 | A1 | 9/2011 | Karlsson et al. |
| 2012/0079201 | A1 | 3/2012 | Dally |

OTHER PUBLICATIONS

Monchiero et al., "Using Coherence Information and Decay Techniques to Optimize L2 Cache Leakage in CMPs", 2009 International Conference on Parallel Processing, Sep. 2009.*
Bienia et al., "The PARSEC Benchmark Suite: Characterization and Architectural Implications", Princeton University Technical Report, Jan. 2008, TR-811-08.
Abts et al., "So Many States, So Little Time: Verifying Memory Coherence in the Cray X1", Proceedings of the International Parallel and Distributed Processing Symposium, Apr. 22-26, 2003.

(Continued)

*Primary Examiner* — Aracelis Ruiz
(74) *Attorney, Agent, or Firm* — Patent Portfolio Builders PLLC

(57) ABSTRACT

System and methods for cache coherence in a multi-core processing environment having a local/shared cache hierarchy. The system includes multiple processor cores, a main memory, and a local cache memory associated with each core for storing cache lines accessible only by the associated core. Cache lines are classified as either private or shared. A shared cache memory is coupled to the local cache memories and main memory for storing cache lines. The cores follow a write-back to the local memory for private cache lines, and a write-through to the shared memory for shared cache lines. Shared cache lines in local cache memory enter a transient dirty state when written by the core. Shared cache lines transition from a transient dirty to a valid state with a self-initiated write-through to the shared memory. The write-through to shared memory can include only data that was modified in the transient dirty state.

27 Claims, 4 Drawing Sheets

(56) References Cited

OTHER PUBLICATIONS

Acacio et al., "A New Scalable Directory Architecture for Large-Scale Multiprocessors", The 7th International Symposium on High-Performance Computer Architecture, 2001. HPCA, Jan. 19-24, 2001, pp. 97-106.
Adve et al., "Shared Memory Consistency Models: A Tutorial", IEEE Computer, Dec. 1996, pp. 66-76, vol. 29, Issue 12.
A. Agarwal et al., "An Evaluation of Directory Schemes for Cache Coherence", Proceedings of the 15th Annual International Symposium on Computer Architecture (ISCA), May 30-Jun. 2, 1998, Honolulu, Hawaii, pp. 280-289.
N. Agarwal et al., "GARNET: A Detailed On-Chip Network Model inside a Full-System Simulator", IEEE International Symposium on Performance Analysis of Systems and Software, 2009, ISPASS, Apr. 26-28, 2009, Boston, Massachusetts, pp. 33-42.
Censier et al., "A New Solution to Coherence Problems in Multicache Systems", IEEE Transactions on Computers, Dec. 1978, pp. 1112-1118, vol. c-27, No. 12.
Chaiken et al., "LimitLESS Directories: A Scalable Cache Coherence Scheme", 4th International Conference on Architectural Support for Programming Language and Operating Systems (ASPLOS), Apr. 1991.
Choi et al., "DeNovo: Rethinking the Memory Hierarchy for Disciplined Parallelism", Proceedings of the 20th International Conference on Parallel Architectures and Compilation Technique (PACT), Oct. 2011.
Goodman, "Using Cache Memory to Reduce Processor-Memory Traffic", ISCA '83 Proceedings of the 10th Annual International Symposium on Computer Architecture, Jun. 1983, pp. 124-131.
Hardavellas et al., "Reactive NUCA: Near-Optimal Block Placement and Replication in Distributed Caches", Proceedings of the 36th Annual International Symposium on Computer Architecture, Jun. 2009, Austin, Texas.
Hossain et al., "POPS: Coherence Protocol Optimization for both Private and Shared Data", 2011 International Conference on Parallel Architectures and Compilation Techniques (PACT), Oct. 10-14, 2011, Galveston, Texas, pp. 45-55.
Kahle et al., "Introduction to the Cell multiprocessor", IBM Journal of Research & Development, Jul./Sep. 2005, pp. 589-604, vol. 49, No. 4/5.
Kaxiras et al., "SARC Coherence: Scaling Directory Cache Coherence in Performance and Power", IEEE Micro, Sep. 23, 2010, pp. 54-65, vol. 30, Issue 5.
Kaxiras et al., "A New Perspective for Efficient Virtual-Cache Coherence", ISCA '13 Proceedings of the 40th Annual International Symposium on Computer Architecture, Jun. 23-27, 2013, Tel-Aviv, Israel.
Kim et al., "Subspace Snooping: Filtering Snoops with Operating System Support", 19th International Conference on Parallel Architectures and Compilation Techniques (PACT), Sep. 11-15, 2010, Vienna, Austria.
Lebeck et al., "Dynamic Self-Invalidation: Reducing Coherence Overhead in Shared-Memory Multiprocessors", Proceedings of the 22nd Annual International Symposium on Computer Architecture, Jun. 1995, pp. 48-59.
Li et al., "Compiler-assisted Data Distribution for Chip Multiprocessors", PACT '10 Proceedings of the 19th International Conference on Parallel Architectures and Compilation Techniques, Sep. 11-15, 2010, Vienna, Austria, pp. 501-512.
Lindholm et al., "NVIDIA Tesla: A Unified Graphics and Computing Architecture", IEEE Micro, Mar.-Apr. 2008, pp. 39-55.
Magnusson et al., "Simics: A Full System Simulation Platform", IEEE Computer, Feb. 2002, pp. 50-58, vol. 35, Issue 2.
Martin et al., "Multifacet's General Execution-driven Multiprocessor Simulator (GEMS) Toolset", Computer Architecture News (CAN), Sep. 2005, vol. 33, Issue 4.
Moshovos et al., "JETTY: Filtering Snoops for Reduced Energy Consumption in SMP Servers", Proceedings of the 7th International Symposium on High-Performance Computer Architecture, Jan. 2001, pp. 85-96.
Muralimanohar et al., "CACTI 6.0: A Tool to Model Large Caches", International Symposium on Microarchitecture, Dec. 2007, Chicago, Illinois, HP Laboratories.
"Summary: The Cache Read/Write Process", http://www.pcguide.com/ref/mbsys/cache/funcSummary-c.html, downloaded Jan. 15, 2013.
Pugsley et al., "SWEL: Hardware Cache Coherence Protocols to Map Shared Data onto Shared Caches", PACT '10 Proceedings of the 19th International Conference on Parallel Architectures and Compilation Techniques, Sep. 11-15, 2010, Vienna, Austria, pp. 465-476.
Ros et al., "VIPS: Simple Directory-Less Broadcast-Less Cache Coherence Protocol", Department of Information Technology, Uppsala University, Sweden, Technical Report, Nov. 29, 2011.
Sorin et al., "A Primer on Memory Consistency and Cache Coherence", Synthesis Lectures on Computer Architecture, Nov. 2011, Morgan & Claypool Publishers, vol. 6, No. 3.
Woo et al., "The SPLASH-2 Programs: Characterization and Methodological Considerations", Proceedings of the 22nd Annual International Symposium on Computer Architecture, Jun. 1995.
Zhao et al., "SPACE: Sharing Pattern-based Directory Coherence for Multicore Scalability", PACT '10 Proceedings of the 19th International Conference on Parallel Architectures and Compilation Techniques, Sep. 11-15, 2010, Vienna, Austria.
Wikipedia, "Cache coherence", http://en.wikipedia.org/wiki/Coherence_protocol, downloaded Jan. 9, 2013.
Wikipedia, "CPU cache", http://en.wikipedia.org/wiki/CPU_cache, downloaded Jan. 15, 2013.
Wikipedia, "CPU cache", http://en.wikipedia.org/wiki/CPU_cache, downloaded May 13, 2013.
Wikipedia, "Kernel (computing)", http://en.wikipedia.org/wiki/Kernel_(computing), downloaded May 13, 2013.
Wikipedia, "Page table", http://en.wikipedia.org/wiki/Page_table, downloaded May 22, 2013.
Wikipedia, "Translation lookaside buffer", http://en.wikipedia.org/wiki/Translation_lookaside_buffer, downloaded May 22, 2013.
Chen, "SLiD—A Cost-Effective and Scalable Limited-Directory Scheme for Cache Coherence", Proceedings of the 5th International Conference on Parallel Architectures and Languages in Europe (PARLE), Jun. 14-17, 1993, Munich, Germany, pp. 341-352.
Cuesta et al., "Increasing the Effectiveness of Directory Caches by Deactivating Coherence for Private Memory Blocks", ISCA '11 Proceedings of the 38th Annual International Symposium on Computer Architecture, Jun. 4-8, 2011, San Jose, California, pp. 93-104.
O'Krafka et al., "An Empirical Evaluation of Two Memory-Efficient Directory Methods", ISCA '90 Proceedings of the 17th Annual International Symposium on Computer Architecture, May 28-31, 1990, Seattle, Washington, pp. 138-147.
Ferdman et al., "Cuckoo Directory: A Scalable Directory for Many-Core Systems", IEEE 17th International Symposium on High Performance Computer Architecture (HPCA), Feb. 12-16, 2011, San Antonio, Texas, pp. 169-180.
Vantrease et al., "Atomic Coherence: Leveraging Nanophotonics to Build Race-Free Cache Coherence Protocols", IEEE 17th International Symposium on High Performance Computer Architecture (HPCA), Feb. 12-16, 2011, San Antonio, Texas, pp. 132-143.

* cited by examiner

SYSTEM AND METHOD FOR SIMPLIFYING CACHE COHERENCE USING MULTIPLE WRITE POLICIES

CROSS REFERENCE TO RELATED APPLICATIONS

This application claims priority to U.S. Provisional Patent Application No. 61/613,080, filed on Mar. 20, 2012, entitled "Cache Coherence with Multiple Write Policies." The entire disclosure of the foregoing provisional patent application is incorporated by reference herein.

BACKGROUND

The present invention relates in general to the caching of data in multiprocessor systems and, more particularly, to simplified cache coherence protocols for shared memory multi-core processing systems utilizing self-invalidation and multiple write policies to maintain coherence in a private/shared cache hierarchy.

In a multiple processor environment, two or more microprocessors (referred to as multiple core, multi-core and many-core) reside on the same chip and commonly share access to the same area of main memory via a cache hierarchy. Shared-memory microprocessors simplify parallel programming by providing a single address space even when memory is physically distributed across many processing nodes or cores. Most shared-memory multiprocessors use cache memories or "caches" to facilitate access to shared data, and to reduce the latency of a processor's access to memory. Small but fast individual caches are associated with each processor core to speed up access to a main memory. Caches, and the protocols controlling the data access to caches, are of highest importance in the multi-core parallel programming model.

To satisfy coherence definitions, coherence protocols react immediately to writes and invalidate all cached read copies. Shared-memory systems typically implement coherence with snooping or directory-based protocols. Directory-based cache coherence protocols are notoriously complex, requiring a directory to constantly track readers and writers and to send invalidations or global broadcasts or snoops. Directory protocols also require additional performance and transient states to cover every possible race that may arise. For example, the GEMS [23] implementation of the MESI directory protocol, a direct descendant of the SUNfire coherence protocol, requires no less than 30 states. Verification of such protocols is difficult and in many cases incomplete [1].

Significant complexity in current protocols comes from strategies for efficicent execution of sequential applications. Complexity in cache coherence protocols also translates into cost. Storage is needed for cache-line state, the directory (or dual-ported/duplicate tags for snooping), and the logic required by complex cache and directory controllers. Significant effort has been expended to reduce these costs, especially the storage cost, but also the verification cost.

In terms of performance and power, complex protocols are characterized by a large number of broadcasts and snoops. Here too, significant effort has been expended to reduce or filter coherence traffic with the intent of making complex protocols more power or performance efficient. In particular, in the many-core cases, a simple and efficient implementation of coherence is of great importance to match the simplicity of the many thin cores. Furthermore, some many-core programming models (e.g., CUDA [21] and CELL [16]) exercise explicit control of the ownership of shared data. In the following description, the term "multi-core" will be used to refer to both multi-cores and many-cores, as the systems and methods described herein have application in all multiple processor core systems. The coherence schemes commonly utilized in the current processing environment have been developed for multi-chip SMPs or distributed shared memory machines where the trade-offs are markedly different from a multi-core cache hierarchy.

Recent research has realized the importance of classifying private and shared data. Some of this research has focused on using hardware for classifying private vs. shared data. Other research has focused on using the operating system or the compiler to perform the classification. The advantage of hardware mechanisms is that they can work at a granularity of a cache line. However, these mechanisms can also have prohibitive storage requirements. Techniques which employ the operating system do not require extra hardware, as the data classification can be stored along with the page table entries (PTEs) at a page granularity. However, if a single block in a page is shared (or even if two different private blocks within the same page are accessed by different cores) the whole page must be considered as shared, thus leading to misclassified blocks. Finally, the disadvantage of the compiler-assisted classification is that it is difficult to know at compile time if a variable is going to be shared or not.

Different proposals have used the private verses shared data classification to reach different goals. Some have utilized the classification to perform an efficient mapping for NUCA caches [14, 20]. While others have used the classification to reduce the number of broadcasts required by a snooping protocol [18], or to reduce the size of the directory cache in a directory-based protocol [11, 12]. Finally, others use the classification for choosing among different behaviors for the coherence protocol [28, 15].

Dynamic self-invalidation and tear-off copies were first proposed by Lebeck and Wood as a way to reduce invalidations in cc-NUMA [19]. The basic idea is that cache blocks can be teared off the directory (i.e., not registered there as cached copies) as long as they are discarded voluntarily before the next synchronization point by the processor that created them. As noted in their paper, this can only be supported in a weak consistency memory model (for sequential consistency (SC), self-invalidation needs to be semantically equivalent to a cache replacement). Lebeck and Wood proposed self-invalidation and tear-off copies as an optimization on top of an existing cc-NUMA protocol. Furthermore, they made an effort to restrict its use only to certain blocks through a complex classification performed at the directory. Their design choices reflect the tradeoffs of a cc-NUMA architecture: that self-invalidation should not be applied indiscriminately because misses to the directory are expensive.

Self-invalidation was recently used by Kaxiras and Keramidas in their "SARC Coherence" proposal [17]. In their proposal, the authors observe that with self-invalidation, writer prediction becomes straightforward to implement. The underlying directory protocol is always active to guarantee correctness. Despite the advantage for writer prediction, however, their proposal increases the complexity of the base directory protocol with another optimization layer and leaves the directory untouched.

Finally, Choi et al. use self invalidation instructions, inserted by the compiler after annotations in the source program, in their application-driven approach [10]. Based on the properties of disciplined parallelism, Choi et al. simplify coherence. However, their approach relies on significant feedback from the application, which must define memory regions of certain read/write behavior, and then convey and represent such regions in hardware. This requires programmer involvement at the application layer (to define the regions), compiler involvement to insert the proper self-invalidation instructions, an API to communicate all this information to the hardware, and additional hardware near the L1 to store this information. The DeNovo approach described by Choi et al. self-invalidates the "touched" data in a phase. The DeNovo approach still implements a directory ("registry") that tracks the writers (but not the readers), and implements the directory in the data array (since shared cache data are stale in the presence of a writer). Although the directory storage cost is hidden, there is still directory functionality in the shared cache.

Consequently, a significant need exists for an improved method of maintaining cache coherence within a multi-core architecture to simplify the verification process and; thereby, reduce the cost and complexity throughout a shared memory processing environment without sacrificing power and performance. Additionally, a significant need exists for a simplified method of maintaining cache coherence which eliminates the need for directories, invalidations, broadcasts and snoops while maintaining or improving performance. Existing prior art cache systems and protocols need improvements to fully take advantage of the multi-core architecture. In particular, the number of unnecessary operations needs to be significantly reduced.

SUMMARY OF THE INVENTION

In accordance with general aspects of the present invention there is provided a multi-core computer system for maintaining cache coherence utilizing a dynamic write policy. The computer system includes multiple processor cores, a main memory operatively coupled to the multiple processor cores, and at least one local cache memory associated with and operatively coupled to each of the processor cores for storing cache lines accessible only by the associated core. Each of the cache lines being classified as either a shared cache line or a private cache line. The system further includes a global cache memory operatively coupled to the local cache memories and main memory, and accessible by the processor cores. The global cache memory being capable of storing a plurality of cache lines. When writing cache lines, the processor cores follow a write-back to the associated local cache memory for private cache lines and a write-through to the global cache memory for shared cache lines.

In a further aspect of the computer system, the shared cache lines can be assigned to a valid state, an invalid state or a transient dirty state. The shared cache lines in the local cache memory which are in the valid state are arranged to transition from the valid state to the invalid state when another core writes the cache line. Additionally, shared cache lines in the local cache memories are assigned to the transient dirty state from the valid state or the invalid state when a shared cache line is written by the associated core. The shared cache lines in the transient dirty state transition to the valid state with a self-initiated write-through to the global cache memory. According to another aspect of the invention, a subset of the shared cache lines in the local cache memory which are in the valid state is arranged to transition from the valid state to the invalid state before the core encounters a synchronization event, and every shared cache line in the local cache memory which is in the transient dirty state is arranged to transition from the transient dirty state to either the invalid state or the valid state before the core encounters a synchronization event. In addition, for a subset of the core accesses to a shared cache line, the core may bypass the local cache memory and read the shared cache line directly from the global cache memory. This subset of core accesses includes atomic instructions.

In yet another aspect, the invention provides a computer system wherein the self-initiated write-through of a shared cache line in a local cache memory which is in the transient dirty state is arranged to update the global cache memory with only the data of the cache line that are modified by the core while the cache line is in the transient dirty state. According to another aspect, the invention provides a computer system in which shared cache lines are further classified into read-only cache lines and read-write cache lines, and the shared read-only cache lines in a local cache memory which are in valid state remain in valid state when the core encounters a synchronization event.

In a further aspect, the present invention provides a method of implementing cache coherency in a computer system having multiple processor cores. The method includes associating at least one local cache memory with each processor core for storing data accessible only by the associated core, the data being allocated to cache lines acted upon by the associated processor core. In addition, the method includes providing a global cache memory, the global cache memory being associated with each of the one or more local cache memories for storing cache lines accessible by all of the processor cores. Cache lines in each local cache memory are classified as either private cache lines or shared cache lines. A write-back operation to the associated local cache memory is performed when a processor writes a private cache line, and a write-through operation to the global cache memory is performed when a processor writes a shared cache line.

The method of the invention can further include assigning each shared cache line to either an invalid state or a valid state, and changing the state of a shared cache line in a local cache memory to a transient dirty state from either the valid or invalid state when the shared cache line is written by the associated core. Further, the method can include performing a self-initiated write-through of the shared cache line from the local cache memory to the global cache memory at a period of time after the shared cache line changes to the transient dirty state. Additionally, the method can include selecting one or more of the shared cache lines in a local cache memory which are in the valid state, and transitioning the selected shared cache lines to an invalid state before the local cache memory encounters a synchronization event. The method can further include determining the data in a shared cache line in a local cache memory that has been modified by the associated core while the shared cache line is in the transient dirty state, and updating the global cache memory with only the modified data. The method can further include classifying the shared cache lines in each local cache memory as read-only cache lines or read-write cache lines, identifying a set of the shared read-only cache lines in each local cache memory which are in the valid state, and retaining the set of valid shared read-only cache lines in the valid state when the associated core encounters a synchronization event. Additionally, the method can include bypassing the local cache memory for a subset of core accesses, and reading the shared cache line directly from the global cache memory. For the core accesses of this subset that require atomicity, the shared cache line is blocked in the global cache memory while the core reads the shared cache line, so that no requests from another core can be processed by the global cache memory for the shared cache line until the shared cache line is unblocked by a write-through.

In a further aspect, the present invention provides a method of implementing cache coherency in a multiprocessor system having multiple processor cores. The method includes associating at least one local cache memory with each core for storing data accessible by the associated core. The data being allocated to individual cache lines acted upon by the associated core. The method further includes providing a global cache memory, the global cache memory being associated with each local cache memory, and storing data accessible by all of the processor cores. The data in the global cache memory being allocated to individual cache lines. Each of the individual cache lines is classified as a private cache line or a shared cache line. The method further includes selecting between different write operations when a core writes a cache line. The selection including a write-back to the associated local cache memory when a processor writes a private cache line, and a write-through to the shared cache memory when a processor writes a shared cache line. The method further includes delaying the write-through up to a synchronization event. The method can further include determining the data modified in the shared cache line during the delay, and writing-through only the modified data in the shared cache line at the end of the delay.

The method and system according to the invention eliminate the need for directories, invalidations, broadcasts and snoops. Indeed, this approach eliminates the need for almost all coherence state (besides the rudimentary valid/invalid and clean/dirty states). The invention improves power-efficiency by considerably reducing the hardware cost (area), with negligible impact on performance and traffic.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings. In the drawings, like numerals represent like elements throughout the several views.

Figure 1:
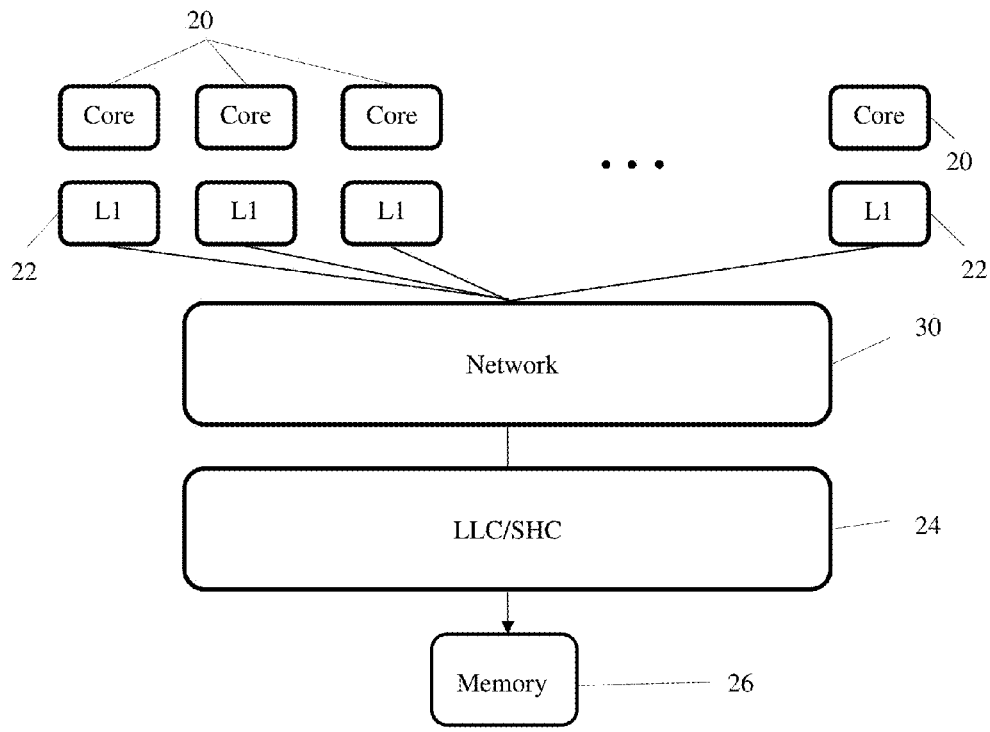
FIG. 1 is a schematic illustration of an exemplary multi-core and cache architecture utilized in the present invention.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention and, together with the description, serve to explain the principles of the invention; it being understood, however, that this invention is not limited to the precise arrangements shown.

DETAILED DESCRIPTION

The following description of certain examples should not be used to limit the scope of the present invention. Other features, aspects, and advantages of the versions disclosed herein will become apparent to those skilled in the art from the following description, which is by way of illustration, one of the best modes contemplated for carrying out the invention. As will be realized, the versions described herein are capable of other different and obvious aspects, all without departing from the invention. Accordingly, the drawings and descriptions should be regarded as illustrative in nature and not restrictive.

The present invention will be described with respect to a generalized multi-core/many-core processing chip (also known as a Chip Multiprocessor, CMP) having two or more cores (processors) and an on-chip cache/memory hierarchy. The methods and systems according to the invention relate to general-purpose multi-cores (few fat cores), many-cores (many thin cores) or GP-GPUs with coherent caches, accelerator multi-cores, and shared-address space heterogeneous architectures with a multi-core coupled to a many-core.

As shown in FIG. 1, the multiple processing cores share access to the same area of main memory via a cache hierarchy. Each processor core 20 is connected to its own small but fast level 1 private data cache 22 (referred to herein as "L1"). Each core 20 may also optionally include a level 1 instruction cache (not shown). A global or shared data cache (SHC) is typically associated with all cores. This global cache is typically also the last-level cache (LLC) before the main memory 26. This cache will be referred to herein as a "LLC/SHC" 24. The LLC/SHC can be a single cache (possibly multi-banked) or partitioned to multiple slices that are distributed with the cores. The latter is known as a "tiled" architecture. In addition to private (L1) cache 22, each core may have one or more additional levels of private caches (not shown) attached below the L1 cache. These additional, intermediate cache hierarchy levels are private to the cores, and are treated in the same manner as the first level, L1 cache. Hierarchical multi-core organizations with multiple levels of intermediate shared caches for groups of cores are treated recursively. The cores 20 and all caches in the system can be interconnected with any network-on-chip, switch, or bus architecture (including multiple buses) as indicated at 30. The cache coherence method of the present invention is interconnect-agnostic, meaning that the coherence protocols are the same whether implemented over a bus, a crossbar, or a packet-based, point-to-point, network-on-chip (NoC). This leads to seamless scaling from low-end to high-end parts or free intermixing of buses and NoCs on the same chip, e.g., in an heterogeneous multi-core/many-core chip.

Cache coherence protocols are described herein using the nomenclature of the GEMS toolset and, in particular, the SLICC cache coherence protocol description language [23]. The following table lists the most common cache coherence transactions mentioned in this description:

| Events/Protocol messages (referring to a specific memory address or a specific cache line address) | Comment |
| --- | --- |
| GetX | Request to get a cache line for writing. Unless otherwise noted this action blocks the corresponding entry in the directory or in the LLC/SHC so no further request for the cache line can be processed until the corresponding entry in the directory or the LLC/SHC is unblocked. |
| Upgr | Request form a private cache to write a cache line that is already cached (like GetX but no data are returned) |

-continued

| Events/Protocol messages (referring to a specific memory address or a specific cache line address) | Comment |
|---|---|
| Invalidation | Request from the directory to a private cache to invalidate a cache line |
| GetS | Request to get a cache line for reading |
| PrRd | Processor Read |
| PrWr | Processor Write |
| Unblock | This protocol message unblocks the corresponding entry in the directory or LLC/SHC. |
| WrB | The cache line is written back to the next cache hierarchy level (towards memory) or to the LLC/SHC. |
| WT_Unblock | The cache line is written through to LLC/SHC and Unblocks the corresponding directory or LLC/SHC entry. In some cache coherence protocols the whole cache line is written through, but in others only the modified data of the cache line are written through (the unmodified data do not affect the contents of the corresponding LLC/SCH cache line). |
| ACK | Acknowledgment that a request has been satisfied |
| DATA | Message carrying data to and from private caches and the LLC/SHC |

Figure 2:
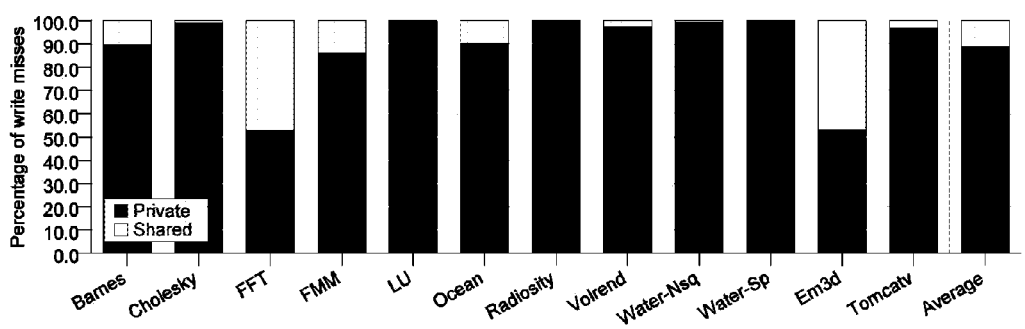
FIG. 2 is a graph illustrating the percentage of write misses in a write-through protocol for both private and shared data.

Significant complexity in current protocols comes from strategies for efficient execution of sequential applications (e.g., the E state in MESI), or optimizations to avoid memory (e.g., the O state in MOESI), ignoring the Last-Level Cache or Shared Cache (LLC/SHC) between the cores and memory. A simple write-through policy to the LLC/SHC would obviate almost all coherence states (even the M state) but is not acceptable due to the negative effect on performance. However, as the inventors have determined, most write misses in a write-though protocol actually come from private blocks, as shown by the graph in FIG. 2. Utilizing this conclusion, the present invention provides a method for dynamically determining a write operation for a cache line in a cache memory hierarchy depending upon the data type. The dynamically determined multiple write policies of the present invention allow for simplification of coherence while maintaining sequential consistency (SC) for data-race-free operation in a weak consistency memory model.

In an initial embodiment of the invention, a selection is made between multiple different write operations within the cache hierarchy depending upon the data classification. These write operations include:

1.) A write-back, in which a cache line (if it has been modified) is written back to the rest of the memory hierarchy when the cache line is replaced or flushed from the cache;

2.) A write-through, in which a write on the cache line (or the whole modified cache line) is forwarded towards the next level of the memory hierarchy; and 3.) A delayed write-through, in which a write-through caused by a write to a cache line (in state Clean) is delayed for an arbitrary period of time.

During the write-through delay, the cache line that is being written-through can be further written by the processor and remains (after the write that initiated the write-through) in a Dirty state. All changes to the cache line are included when the delayed write-through is sent to the next cache level. After the delayed write-through, the cache line reverts to the Clean state.

Several different methods can be utilized in the present invention for arranging the delayed write-through. In a first of these methods, a delayed write-through uses a write-coalescing cache line buffer on the side of the L1 cache. This buffer drains slowly as new entries are allocated into it (possibly in FIFO order). A copy of the cache line is created in this buffer when a processor core write initiates the write-through on a cache line in state Clean. Further core writes to the cache line update both the buffer copy and the L1 cache line. When the cache line copy is ejected from the coalescing buffer, the write-through is sent to the next cache level towards memory.

In a second method, a write-though is delayed by inserting the corresponding cache line address in a finite FIFO (first-in-first-out) queue. The cache line is sent to the next cache level when its address is forced out of the FIFO. The delay of the write-through corresponds to the time the address spent in the FIFO. In a modification of this method, the FIFO is replaced by the set of Miss-Status Handling (or Holding) Registers (MSHRs) that handle the cache misses (including coherence misses).

In another method, a write-through is delayed by starting a timer for a number of cycles from the time that the cache line is first or last written by the core. In another method, a set of timers is associated with the entries of a FIFO queue. The address of the delayed write-through is inserted in the FIFO queue and a timer is started. If the timer has not expired it can be optionally restarted each time the cache line is written so that the timer expires some time after the last write to the cache line. The write-through occurs when either i) the timer expires, or ii) the address is forced out of the FIFO queue. This is similar to the FIFO queue method described above, but with an upper bound on the delay (enforced by a timer) that a write-through can experience. In a modification of this method, the FIFO is replaced by the set of Miss-Status Handling Registers (MSHRs) that handle the cache misses (including coherence misses). In a modification of this method the period counted by the timers can be adjusted at run-time.

In another method, a write-through is delayed from the time the processor core writes a Clean cache line, to the time that the processor executes a flush instruction that causes the write-through to occur for this cache line, or a store & flush instruction that modifies a cache line and immediately causes a write-through to occur. After the flush or the store & flush instruction, the cache line is still resident in the cache and in state Clean.

In the present invention, the selection between the different write policies can be based on the differentiation of data as private (accessed by a single core or thread) or shared (accessed by multiple cores or threads). For private data, a write-back operation to a private cache L1 is utilized due to the absence of a coherence issue. For shared data, a write-through (or delayed write-through) operation to the shared cache SHC is selected. For the shared data, the write-through policy simplifies the protocol to two stable states (Valid/Invalid), eliminating the need to track writers at the LLC/SHC directory, and eliminating read-indirection through the directory (since the correct data are always found in the LLC/SHC).

In a first embodiment, the cache controller selects from among the write policies depending upon the data classification as private or shared at the page-level. The dynamic write policy is controlled by page-level information supplied by the Translation Lookaside Buffer (TLB). TLB entries use two bits per entry to indicate the Private/Shared (P/S bit) status of the page, and one bit to lock the TLB entry (L bit) when switching from private to shared or vice versa. The P/S bit of the page controls the write policy for all of the corresponding cache lines in the page and, thus, whether a write-through will take place for these cache lines.

The data classification can be performed by the operating system. Pages are divided into private and shared at the operating system (OS) level, depending on the observed accesses. Private pages are accessed by a single core or thread. Shared pages are simultaneously accessed by multiple cores or threads. If threads are allowed to migrate from core to core, classifying pages by observing thread accesses avoids misclassification due to migration.

Alternatively, the application can define the page type as private or shared when the allocation of the page is requested. The application can change the classification of a page at run-time. In another embodiment, when performed by the application, data classification for the dynamic write policy is address-based. Private and shared data are differentiated by their address. The application allocates private and shared data to separate and distinct address ranges that are pre-defined and known to the cache controller, or communicated via a set of control registers to the cache controller.

Additionally, data can be classified as private or shared using a dynamic, instruction-based, classification process. Memory access instructions (load/store instructions) are tagged (possibly using a Program-Counter-indexed table) dynamically, as instructions that access either private or shared data. The instruction-based approach allows quick classification for all the data accessed by an instruction, since the instruction behavior, once detected, rarely changes. Dynamic detection of the number of cores or threads that access a cache line is done in the LLC/SHC, and this information is related to the instructions that access the cache line. Accesses to private and shared data are differentiated by the load and store instructions (for example: "Load/Store private data" and "Load/Store shared data"). Access instructions (load/store) can carry data classification information (a data-type field encoded in the instruction) and transmit this to the cache along with the accessed address. Additionally, one or more address bits can also be "appropriated" by the access instruction to differentiate the types of accesses. Data classification can be made explicit for each cache line. Cache lines are brought in the cache, classified, and tagged as private or shared, by the access instructions or a special tagging instruction. The "write policy" field of the cache line, or a separate field associated with each cache line, can be used to store the classification.

In a first embodiment, the present invention includes a cache coherence protocol needing only two stable states for each L1 cache line, Valid (data is valid and can be read or written) and Invalid (data is invalid and must be fetched from the LLC/SHC). In addition to the state bits (V/I), each of the cache lines also has an associated dirty/clean status bit (D). In this embodiment, selection from amongst the multiple write options is based upon the classification of L1 cache data as private or shared. This protocol will be referred to herein as "VIPS" in reference to the Valid/Invalid and Private/Shared characteristics. The VIPS protocol supports Sequential Consistency (SC) in the presence of data races. VIPS simplifies the directory by tracking only the readers of shared cache lines but not their writers. VIPS operates on any message-based, on-chip, interconnection network.

Figure 3:
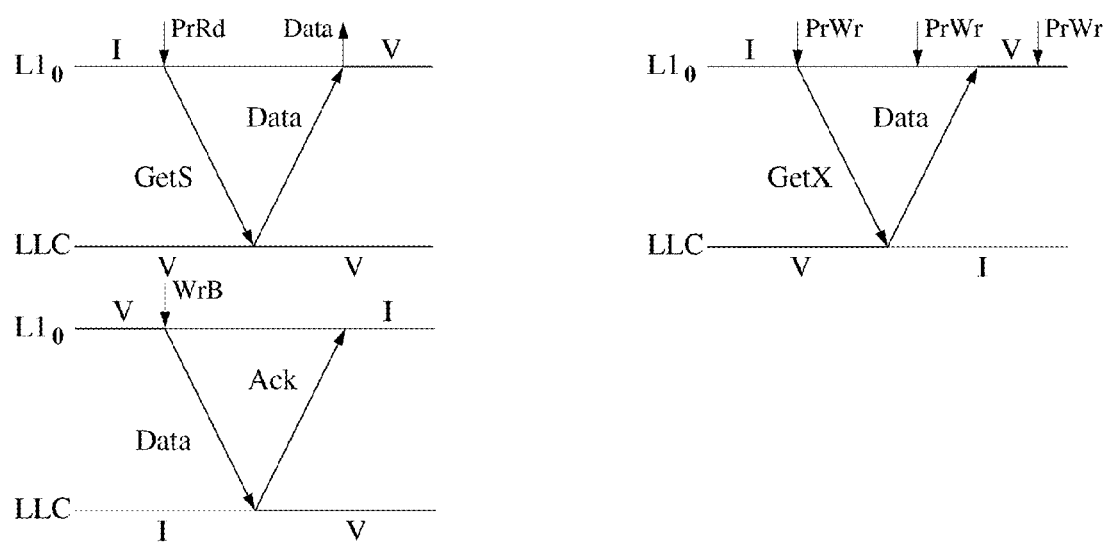
FIG. 3 illustrates read (PrRd), write (PrWr), and write-back (WrB) transactions for private lines according to the invention.

In the VIPS protocol, a write-back to the L1 cache is performed for private data written by the associated core. The protocol transactions for private lines are simple, since no effort is expended on maintaining coherence. FIG. 3 shows the read (PrRd), write (PrWr), and eviction (WrB) initiated transactions for the L1 private cache lines. For a private data request, the LLC/SHC cache controller does not block the corresponding cache lines. The write-back transaction requires an acknowledgment for memory ordering purposes (so that fence instructions can detect its completion) in the corner case when a cache line changes designation from private to shared after it has been written.

Figure 4:
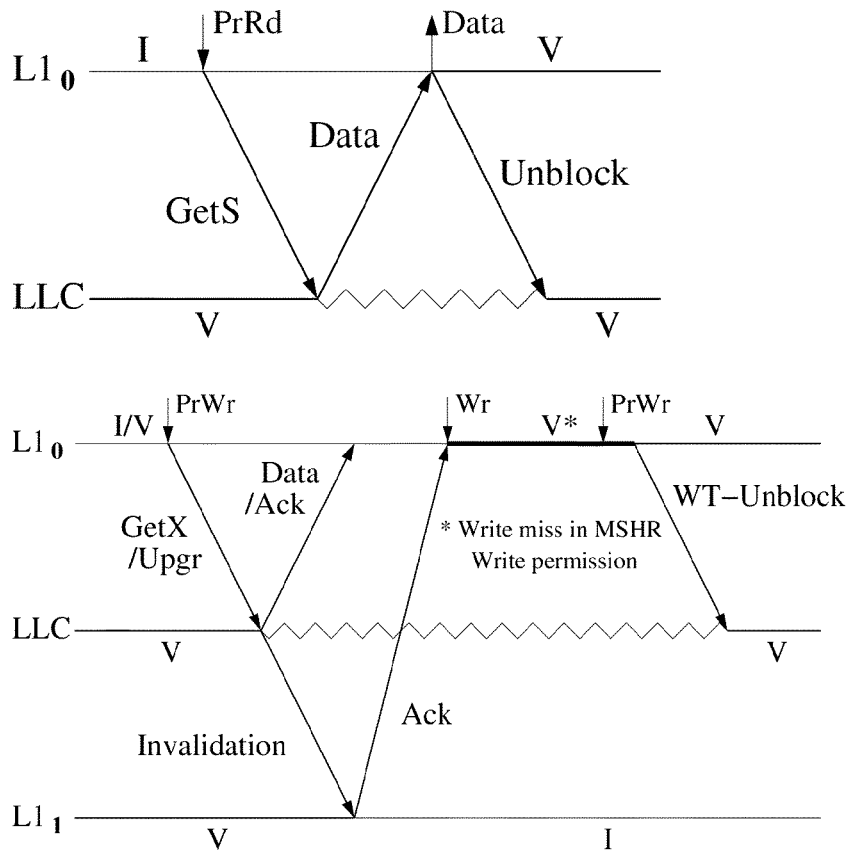
FIG. 4 illustrates read (PrRd) and write (PrWr) transactions for shared lines according to the invention.

For shared data cache lines, a write-through is performed to the shared cache (LLC/SHC). FIG. 4 illustrates read (PrRd) and write (PrWr) transactions for shared cache lines. In the write-through transaction, the LLC/SHC controller is blocked both for PrRd and PrWr transactions, and requires Unblock messages to unblock it. A PrRd transaction that misses in the L1 cache gets the L1 cache line and sets the cache line state to Valid. PrWr transactions send a GetX to the LLC/SHC controller that blocks the line (and gets the data if needed). Copies in other cores are invalidated (with the acknowledgments returning to the writer). When all acknowledgements arrive the write (Wr) is performed.

The write-through to the LLC/SHC can be delayed arbitrarily, using the delayed write-through process described above, keeping the LLC/SHC cache line blocked during the transaction, and preventing other transactions on the line. During this delay, the cache line remains in the valid state and can be read or written, but may have a different value than a copy in LLC/SHC. Accordingly, the cache line is in what will be referred to herein as a transient dirty state or "V*". The transient dirty state is invisible to the rest of the system (no external cache coherence transactions can encounter this state) and allows the write-through to the LLC/SHC to be delayed for an arbitrary period of time (user or system selected, or set at implementation). The transient dirty state exists only for outstanding write-throughs which can be handled in miss status handling registers (MSHRs). While the L1 line is in state V and dirty (V*), the line can be written multiple times by the same core. The write-through (WT-Unblock) clears the L1 dirty bit, unblocks the line, and writes the new data in the LLC/SHC. A PrWr on a clean, valid line initiates a write-through anew. The transient dirty state allows the L1 line to be written multiple times by the same core. This corresponds roughly to a MESI "Modified" state, but is strictly transient (exists only from the GetX to the write-through that unblocks the LLC/SHC line) and is invisible to transactions from other cores. Since the delayed write-through is transparent to other cores, the protocol has essentially the same states as a traditional simple write-through protocol, thus significantly reducing the number of race conditions and, therefore, transient states with respect to a MESI protocol.

In an alternative embodiment, a dynamic write policy can be implemented outside the L1 cache. In this embodiment, the L1 is designed as a write-back cache with a dirty bit corresponding to each cache line. When a write-through is desired, the equivalent of a replacement action is induced on the corresponding cache line, causing the data to be written back (if in state "Dirty"), setting the Clean/Dirty bit to Clean, but leaving the cache line resident and Valid in the cache. Additionally, the write-back of a cache line can be induced by a flush instruction that causes the write-back to occur for this cache line or a store & flush instruction that modifies a cache line and immediately causes a write-back to occur. After the flush or the store & flush instruction, the cache line is still resident in the cache and in state Clean. According to another method, each cache line can have a corresponding "write policy" field, comprising one or more bits, that indicates one write policy (out of a number of available write policies) to be used on writes to the cache line.

In an additional embodiment, the present invention further simplifies cache coherence by selectively self-invalidating shared data from the L1 caches at processing events, such as, for example, program synchronization (lock acquire and release, barrier, wait/signal synchronization), interrupts, system calls or memory ordering points, or special instructions inserted by the programmer or compiler. Either all of the shared data in the L1 cache, or a subset thereof, may be self-invalidated based on various criteria. The self-invalidating operation of the present invention differs from the self-invalidation of read-only tear-off copies described above with respect to the Lebeck and Wood reference, because in the present invention all cache lines are identified as tear-off, even the ones that are written. This self-invalidating step eliminates the need to track readers for invalidation, thereby obviating the need for a directory or for broadcasts and snoops. This embodiment will be referred to herein as "VIPS-SF".

The VIPS-SF protocol includes the steps described above with respect to the VIPS protocol. In addition, VIPS-SF further includes having the individual cores make copies of shared cache lines present in their L1 cache. These shared cache lines are not registered in any directory structure anywhere in the system. The cores invalidate these copies at the next synchronization point. With VIPS-SF, all the cache line copies are unregistered (there is no directory) including those that are written. All shared data in the L1 caches whether read or written to—not just data brought in as Read-Only—are not tracked by any directory. A core encountering a processing event such as, for example, synchronization (lock acquire, lock release, barrier, wait/signal synchronization), memory ordering instructions (memory fences or memory barriers), special instructions inserted by the programmer or by the compiler, interrupts, or system calls, self-invalidates all the shared data from the associated L1 cache. This method is considered "selective" self-invalidation since only shared and not private data are self-invalidated.

The VIPS-SF protocol further includes changing a subset or all of the shared cache lines that are in state Valid and Clean to state Invalid, and forcing all delayed write-throughs for the shared cache lines to be performed when a core encounters a processing event as described above. Following the forced write-through, the corresponding cache lines are set to state Invalid. The VIPS-SF protocol can force and then wait for all outstanding write-throughs to complete at the LLC/SHC. In an alternative embodiment, the VIPS-SF protocol may exclude shared-read-only data from being invalidated by the selective-self-invalidate, thereby leaving the shared-read-only data in state Valid. Alternatively, shared data that have been written locally (i.e., modified by the core) in the cache may be excluded from being invalidated by the selective-self-invalidate and remain Valid. Individual dirty bits per word can be provided for each cache line to prevent invalidation of its dirty words.

In another embodiment, shared-written data that has not been written to from the time the data was brought into a L1 cache until the time that the selective self-invalidate takes place is excluded from being invalidated by the selective-self-invalidate event. Additionally, the application, monitoring hardware, or the operating system via the page table at a page granularity, can classify the shared data brought into the cache as self-invalidate (to be self-invalidated) or no-self-invalidate (to be excluded from the self-invalidate) at the next selective-self-invalidate event. The selective-self-invalidation can be initiated by a processor instruction that precedes synchronization instructions, synchronization functions (that consist of multiple processor instructions), or memory ordering instructions. Alternatively, the selective-self-invalidation is initiated automatically by memory ordering instructions, atomic instructions, or synchronization instructions.

Implementing selective-self-invalidation requires very little change to the cache design. Valid bits are guarded by per-line Private/Shared (P/S) bits. The P/S bits are set when a line is brought into the L1 cache. Subsequently, a self-invalidate signal resets all the valid bits guarded by P/S bits in state Shared. Selective-self-invalidate can be executed with valid bits that are implemented as clearable flip-flops outside the L1 arrays. The selective-self-invalidate protocol implies a weak consistency memory model and works with data-race-free (DRF) programs, thereby providing sequential consistency for DRF.

Figure 5:
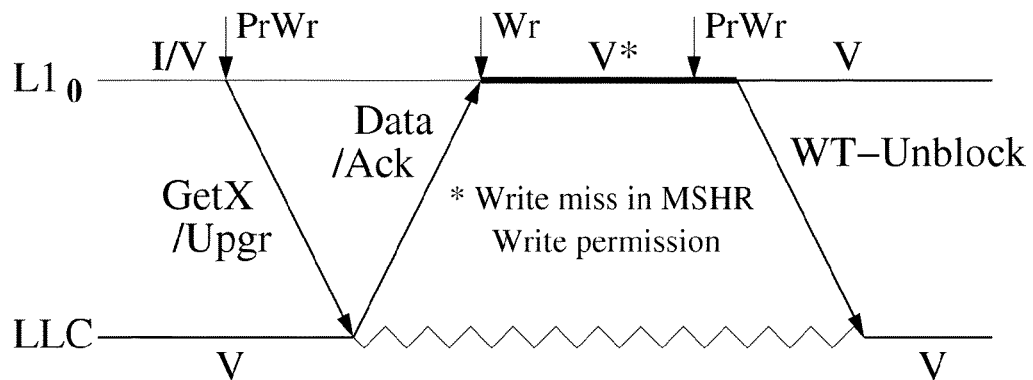
FIG. 5 illustrates write (PrWr) transactions for shared lines in the VIPS-SF protocol according to the invention.

FIG. 5 illustrates the simple write (PrWr) transactions for the shared lines with selective-self-invalidate (the protocol for private lines and the read (PrRd) transactions remain the same as shown in FIGS. 3 and 4). The primary difference between VIPS and the selective-self-invalidate embodiment is the elimination of invalidation transactions. Blocking of LLC/SHC lines is still employed in this protocol and implemented at the LLC/SHC controller. Another difference with the selective-self-invalidate embodiment is that write-throughs cannot be delayed beyond a synchronization point, since updates to shared data need to be made visible to other cores after synchronization. Any outstanding write-throughs are forced to complete on synchronization. This translates to a flush of the corresponding structures that handle the delayed write-throughs along with the selective-self-invalidate of the cache.

To support blocking, a block/unblock bit is needed only for the lines for which an outstanding cache transaction (including but not limited to: read misses, write-throughs, delayed write-throughs, write-backs) is in progress. The number of outstanding (or incomplete) transactions is bounded by the number of cores multiplied by the maximum number of outstanding transactions allowed in each core. The corresponding number of block/unblock bits, each associated with a cache line address tag, is provided in a separate structure in the LLC/SHC cache controller.

The VIPS-SF protocol is described above with respect to write-throughs at a cache line granularity. The implication is that the VIPS-SF protocol requires data-race-free operation at a cache line granularity. The protocol could be modified to always re-read the LLC/SHC line with every new write (every GETX), but this would considerably increase traffic. In an alternative embodiment, the VIPS-SF protocol is modified to perform write-throughs at a word granularity. This alternative embodiment will be referred to herein as the Multiple-Writer-Merge protocol or "VIPS-M". By performing write-throughs at a word granularity, VIPS-M can reduce the total number of words transferred to the LLC/SHC.

Write-throughs at a word(byte) granularity require per-word(byte) dirty bits. This allows multiple concurrent writers on a cache line (false sharing) to write-through to the LLC/SHC just the words(bytes) they modify but no other. Write-throughs from different cores are merged in the LLC/SHC. Immediately seeing the new values written by other writers is not a requirement in a weak consistency memory model already implied by selective-self-invalidate. For example a word(byte) written by another writer cannot be read without synchronization—this would constitute a data race. Values written in the same cache line by others become visible only after a selective-self-invalidate. Write-throughs at the word (byte) granularity eliminate the need for blocking shared cache lines at the LLC/SHC controller.

Figure 6:
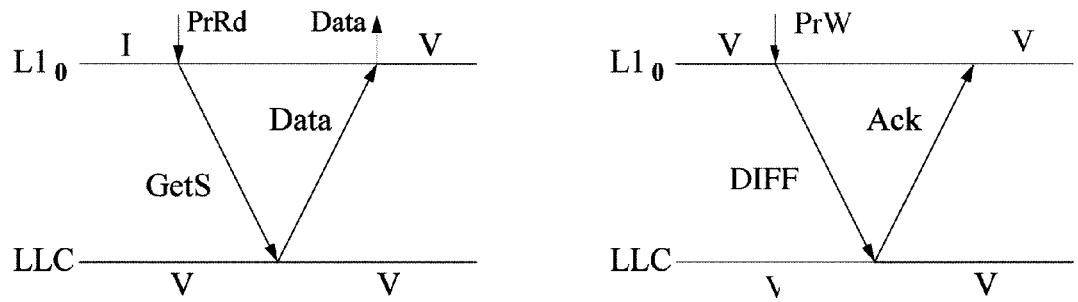
FIG. 6 illustrates read (PrRd) and write (PrWr) transactions for shared lines in the VIPS-M protocol according to the invention.

VIPS-M equates the protocol for shared, data-race-free data to the protocol for private data. At word granularity, the write transaction can be simplified to just a write-through without even sending a write request (GetX) to the LLC/SHC (that would block the LLC/SHC line). This produces the same transaction as shown in FIG. 3 for private data write-backs, except that the LLC/SHC line remains valid. FIG. 6 shows the VIPS-M protocol for Read (PrRd) and Write (PrWr) transactions. Using the VIPS-M protocol, practically all data, whether shared (data-race-free) or private, are handled in exactly the same manner without any state in the LLC/SHC. The only difference is in the timing of when dirty data is put back in the LLC/SHC. Private data follow a write-back on eviction policy, while shared, data-race-free data follow a delayed (up to the next memory ordering or synchronization point) write-through policy.

The VIPS-M version of the protocol requires tracking exactly what has been modified in each dirty line in order to selectively write back only the modified words to the LLC/SHC. One method of tracking modifications is by using per-word(byte) dirty bits for every line in the L1 cache. Alternatively, a new flush instruction can be implemented that writes through only the modified words(bytes) of a cache line. Another alternative is to have dirty bits at the specified granularity only for delayed write-throughs. These per-word(byte) dirty bits do not need to be kept in each cache line, but only in the additional structure that handles the delayed write-throughs.

The VIPS-M protocol does not support Sequential Consistency (SC) for data races. This is because without a directory or broadcasts, a core writing a memory location cannot invalidate any other cores that may be reading this location. This violates the definition of coherence but it is actually an acceptable behavior for a weak consistency memory model. Thus, the VIPS-M protocol is incoherent for data races but satisfies the definition of coherence for the important class of Data-Race-Free (DRF) programs. Similar to SC for DRF, the invention provides coherency for DRF.

In addition to the above embodiments, the present invention provides a method for coherence specifically for data involved in data races such as those, for example, that appear in synchronization operations. This method does not require a directory, invalidations, or broadcasts to handle data races. Synchronization data accessed by atomic Read-Modify-Write (RMW) instructions (such as Test & Set or Compare & Swap, etc.) or Load-Link/Store-Conditional instructions, which inherently rely on data races, invoke this coherence method, bypass the L1 cache and go directly to the LLC/SHC, where the write-throughs are visible.

Synchronization involves data races. Instructions such as, for example, Test & Set or Compare & Swap, race to read-modify-write atomically a memory location if a condition is met (i.e., the "Test" or "Compare" parts). If a condition is not met, a copy of the memory location allows a core to spin locally in its L1 cache until the condition is changed by another core. Without a directory, broadcasts, or snooping, there are no invalidations, and a core cannot "signal" a change in the condition to the other cores that might be spinning, endangering forward progress. According to one embodiment of the invention, a synchronization protocol is introduced in which atomic instructions always invalidate the L1 cache line and re-read the LLC/SHC copy of the cache line they access. In this disclosure, the Test & Set atomic Read-Write-Modify instruction will be used as an example. However, it should be understood that the disclosed method can be applied in general to other atomic Read-Write-Modify synchronization instructions or primitives.

Figure 7:
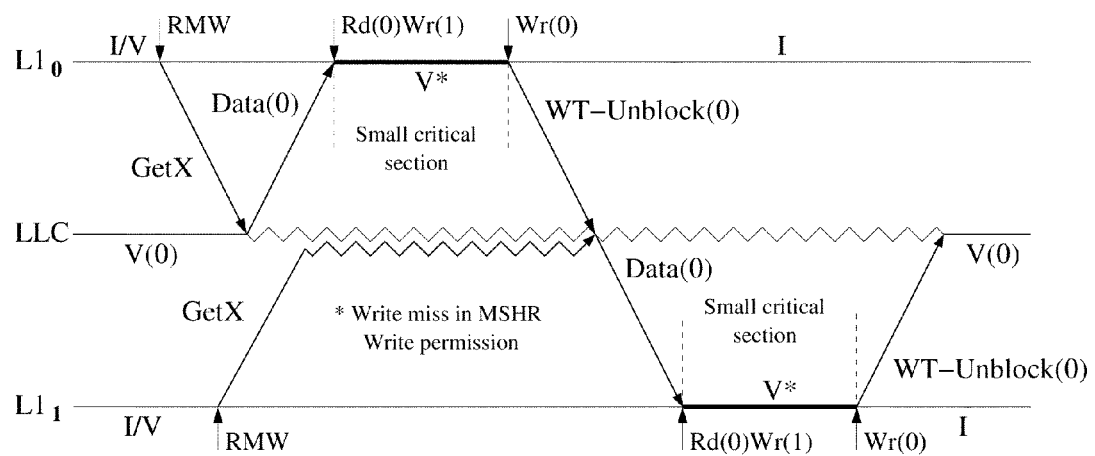
FIG. 7 illustrates a Synchronization protocol according to the invention.

The synchronization protocol is shown in FIG. 7 for the Test & Set instruction. Regardless of the existence of an L1 copy (which is invalidated if it exists), an atomic instruction sends a GetX to the LLC/SHC. If the LLC/SHC line is unblocked, the cache line data is returned to the core and cache (regardless of the existence of a previous Valid copy in the core's cache). If the test succeeds, the line is written with a new value (indicating, for example, that a lock is held by a core). Throughout the duration of the Read-Modify-Write instruction, the LLC/SHC line is blocked by the LLC/SHC controller. The LLC/SHC line remains blocked until unblocked by a write-through from the requesting core. In the interim, no other core can complete any transaction on that cache line (as core $L1_1$ in FIG. 7). Requests from other cores enter a finite queue (bounded by the number of cores) managed by the LLC/SHC controller, or are negatively acknowledged to their source so that the request can be repeated in the future.

The write-through of the atomic RMW instruction, (i.e., the transition from V* to V) can be delayed by using any of the delayed write-through embodiments described above. By delaying the write-through of the atomic instructions in the MSHRs, the completion of a successful lock acquire is delayed. This has a significant advantage. The longer the write-through of a winning lock acquire is delayed, the greater the reduction in the LLC/SHC spinning of the other cores that are competing to get the lock at the same time. Other cores are blocked at the LLC/SHC controller, and cannot even complete the Test part of the Test & Set instruction. In fact, it is quite possible that for a short, critical section the write-back of the Test & Set can be delayed in the MSHR for the whole duration of the critical section, as shown in FIG. 7. The lock release operation, which is a simple write on the same lock, coalesces with the delayed write-through of the Test&Set. While the core spinning can be eliminated for short critical sections, for longer periods the write-through of the atomic instruction eventually completes, and spinning resumes by the other waiting cores. This spinning in the LLC/SHC cache can increase traffic, so an exponential back off in software may lessen it. After the lock release, the delayed write-through may be forced to complete immediately to pass the lock to the next core in line. Update operations are similar to the synchronization operations, but for ordinary loads and stores when the accessed data are classified as having data races.

In the dynamic write policies of the present invention, cache lines that change from private to shared in turn change the write policy for the cache line from write-back to write-through. Consequently, those cache lines marked as Dirty in the L1 cache are cleared by means of a write-through (of the modified cache line) or a delayed write-through transaction Page level. A page accessed by a single core starts as private in the page table, so a write-back policy is applied for every requested line within that page. When a second core accesses the same page, the core notices that the page is tagged as private by another core. The first core is interrupted, and its TLB entry updated so the first core can see the page, henceforth, as shared. All the cache lines in a cache belonging to a page that changes classification from private to shared also change write policy. In one embodiment, all cache lines in the cache are checked as to whether they belong to the accessed page and, if so, the classification of the cache lines is changed. Alternatively, a special "scrub" function can be provided to match all tags in the cache that belong in the same page by comparing only the tag address bits that correspond to the page bits.

Bus Protocol Versions

The protocols described above may be applied in a bus or a multiple-bus architecture, as well as a packet-based on-chip interconnection network. The bus versions of the protocols are the same concerning the protocol states and protocol transitions. In the bus versions, the ACK messages (acknowledgment messages) in the protocols are not needed. Instead, the acknowledgement for a request is given implicitly when the bus is acquired for sending a request. Write-throughs and delayed write-throughs also are considered complete when the bus is acquired.

For the protocols described above, an interface is introduced to other cache coherence protocols via the LLC/SHC. The LLC/SHC is interfaced to an invalidation-based protocol (e.g., MESI or MOESI) with additional state for LLC/SHC blocks, and a directory (or broadcasts and snooping) for the caches that use MESI or MOESI. The protocols have no invalidation for the L1s, or any additional levels of private caches, and the combined coherence protocol works correctly for Data-Race-Free operation.

Multithreading-aware Selective-Self-Invalidate

The invention described herein may utilize a selective-self-invalidate for the caches that are shared by more than one thread running on the core in multithreaded (MT) or simultaneous multithreaded (SMT) mode. Multithreading-aware selective-self-invalidate differentiates among shared data belonging to different threads and operates only on the data of the thread that initiates the selective-self-invalidate. Shared data accessed by more than one thread are self-invalidated regardless of the thread that initiates the selective-self-invalidate.

Inclusion Policies

Additionally, the present invention may utilize a dynamic inclusion policy for caches, where the inclusion policy is selected per cache line from these possible policies:
  a.) Inclusive policy. A cache line that exists in any level of private caches must also be present in the LLC/SHC.
  b.) Non-Inclusive policy. A cache line that exists in any level of private caches may also be present in the LLC/SHC but this is not enforced.
  c.) Exclusive policy. A cache line exists either exclusively in any level of private caches or exclusively in the LLC/SHC.

In a MESI protocol, where the directory information is stored along with the LLC/SHC entries, inclusion between the L1 and the LLC/SHC is enforced. When a line is evicted from the LLC/SHC, the directory information is evicted as well, and for the sake of coherence, all copies in L1 are invalidated. In the protocols described above, private lines do not require directory information and, therefore, we can relax the inclusion policy to:
  a.) An exclusive policy for private lines can save extra LLC/SHC storage, thus reducing expensive off-chip misses. However, if a silent eviction of clean copy is performed at the L1, a subsequent miss for that line will also miss in the LLC/SHC, thus requiring an expensive off-chip access. One option for the exclusive policy for private data is to victimize a clean copy from the private cache(s) into the LLC/SHC, (which increases traffic, but saves latency).
  b.) A non-inclusive policy where data requested by the L1 with read-only permission are also stored in the LLC/SHC. Clean evictions can thereby be silent both in the L1 and in the LLC/SHC.

In the VIPS-M protocol, inclusion is not required for any line since we do not have directory information in the LLC/SHC. Therefore, the same non-inclusive policy described for private lines in the VIPS protocol, is applicable to shared lines in the VIPS-M protocol.

Optimizations

Self-invalidation can cause needless misses on shared data that have not been modified. In the present invention, pages can be tagged as Read-Only (RO) if not written, and Read-Write (RW) otherwise. A page starts as RO, but transitions to RW on the first write (there is no reverse transition). Because the page is shared, all the cores that have a TLB entry must be interrupted and notified of this change. Cache lines belonging to RO pages are spared from self-invalidation.

OS, Context Switches, Migration

Operating system (OS) code and data can be more complicated than applications. One issue in dealing with the OS is page classification. The OS executes in all cores. This means that even a simple migration from one core to another can (falsely) tag a private page as shared in the classification method disclosed herein. In addition, many times the OS executes concurrently on many cores, which leads to a misclassification for data that are not actually shared, but their page appears to be. Although this also happens in applications, it is much more pronounced for OS pages. In fact, the amount of (truly) shared data in the OS is relatively low, but most of its pages can be classified as shared. Better classification (possibly with reverse adaptation) or migration-aware classification by the OS, can help alleviate OS page misclassification. Another issue is the selective-self-invalidation of shared data by the OS. In the implementation described herein, context switches, system calls, input/output, etc., conservatively self-invalidate L1 shared data, so that updates are made visible to other cores. This may negatively impact both application and OS performance, and could be optimized in any number of ways, including tagging the L1 lines as system or user (similar to the thread ID tagging for SMT discussed above).

Verification

In VIPS-M, the protocols for private and shared (DRF) data are the same. There are only two stable states (Valid/Invalid) and two transient states (Invalid-to-Valid and Valid-to-Invalid) in the L1 caches, and no states at all in the LLC/SHC (no blocking). Verification is thus straightforward, and significantly easier than MESI, which requires extensive state exploration. The synchronization protocol requires more effort to verify, because it has LLC/SHC blocking and protocol races.

The definition of coherence, called the Single-Writer/Multiple-Reader (SWMR)/Data-Value invariant, states:
  "For any given memory location, at any given moment in time, there is either a single core that may write it (and that may also read it) or some number of cores that may read it."
  "Data-Value Invariant: the value of a memory location at the start of an epoch is the same as the value of the memory location at the end of its last read-write epoch."

A coherence protocol that satisfies this definition is invisible to the underlying memory consistency model. In other words, "correct" coherence cannot weaken a memory model. This definition is used to reason about the behavior of the protocols described herein with respect to memory models. Table 3 summarizes the results.

Step 1: VIPS Protocol.

The VIPS protocol adheres to the SWMR definition without constraints. Even in the face of data races and/or false sharing, it allows only one writer at a time (because of the invalidation) and guarantees that values are propagated correctly because of the blocking on the LLC/SHC line. It is therefore invisible to the memory consistency model and, thus, can support even the strictest model: sequential consistency (SC). Even the difference from the MESI protocol, the fact that VIPS has automatic downgrades and not "forced" downgrades, is inconsequential, since there is at least one SC execution that corresponds to a small delay of the downgrade.

Step 2: VIPS-SF and VIPS-M Protocols.

The lack of a directory and invalidations in the VIPS-SF and VIPS-M protocols makes the protocols incoherent for data races, but adheres to the SWMR definition for data-race-free operation.

It is easy to see how Step 2 violates the SWMR invariant for data races. Consider the following classic example for SC in Table 2. In a SC implementation, r1 and r2 cannot both be 0 after the execution of the code shown for cores C1 and C2. A coherence protocol adhering to the SWMR/Data-Value invariant cannot change this. However, Step 2 does. Assume that y is cached in C1 before the execution of the C2 code. Since C2 cannot invalidate the cached copy of y, L1 will load 0 into r1. Similarly for x in C2, resulting in both r1 and r2 having the value 0, even after both writes have been performed. The single-writer invariant is violated.

TABLE 2

SC litmus test

| Core C1 | Core C2 | Comments |
|---|---|---|
| S1: x = NEW; | S2: y = NEW; | Initially x = 0, y = 0 |
| L1: r1 = y; | L2: r2 = x; | |

It is equally straightforward to show that VIPS-SF is incoherent with false sharing. As was shown above, unsynchronized write-throughs to the same line can bring the system into a non-recoverable state. This is because two writers involved in false sharing update not only their part of the line, but also the other's, violating the single-writer invariant. Assume, however, that a program is DRF at a cache line granularity. Then VIPS-SF satisfies the coherency definition: i) there is only one writer per cache line at a time (otherwise there would be a data race), and ii) the data value invariant holds because writes and reads are separated by synchronization, whereupon all shared lines are selectively-self-invalidated. Thus, VIPS-SF is coherent for data-race-free cache lines, which means that it is invisible to SC for DRF-cache lines.

Finally, the VIPS-M protocol satisfies the SWMR/Data-Value invariant for DRF operation at a word granularity because write-throughs are performed at this granularity. Assuming DRF operation at the word level, false sharing no longer violates the single writer invariant. Thus, VIPS-M is invisible to SC for DRF.

Similar to the reasoning of SC for DRF, the present invention implements coherence for DRF. DRF satisfies by itself the single writer multiple reader (SWMR) invariant. All that is necessary is to guarantee the Data Value invariant, and this is achieved by writing-through the correct data and selectively-self-invalidating the L1 at synchronization. This is why in VIPS-M the protocol for shared DRF data can be equated to the protocol for private data. The exception, of course, is due to synchronization data (accessed by atomic instructions) which inherently have data races. Changing the synchronization model to one not based on data races would eliminate the need to have a protocol just for these special cases.

TABLE 3

Consistency and Coherence supported by the protocols.
VIPS: Valid/Invalid Private/Shared, VIPS-SF: Selective-Self-Invalidate, VIPS-M: Selective-Self-Invalidate and Multiple-Writers-Merge

| | Programs | | |
|---|---|---|---|
| | Non-DRF | DRF-word (Non-DRF cache line) | DRF-cache line |
| Step 1: VIPS | SC, Coherent | SC, Coherent | SC, Coherent |
| Step 2: VIPS-SF | Incoherent | Incoherent | SC for DRF_cache line |
| Step 2: VIPS-M | Incoherent | SC for DRF_word | SC for DRF_cache line |

The VIPS-SF and VIPS-M protocols described above provide very simple coherence that requires no directory, no state bits in the caches (other than the standard Valid/Invalid and Dirty/Clean bits), no broadcasts/snoops, nor invalidations, but actually perform as well or better than a directory protocol. The VIPS-M method further reduces control message traffic by eliminating invalidations, and minimizes data traffic by sending only cache line "diffs" (i.e., only the modified contents) to the LLC/SHC from multiple simultaneous writers. Diffs are correctly merged in the cache lines—in the absence of data-races—thereby solving the false-sharing problem.

Having shown and described various versions in the present disclosure, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, ratios, steps, and the like discussed above are illustrative and are not required. Accordingly, the scope of the present invention should be considered in terms of the following claims and is understood not to be limited to the details of structure and operation shown and described in the specification and drawings.

REFERENCES

[1] D. Abts, S. Scott, and D. J. Lilja. So many states, so little time: Verifying memory coherence in the Cray X1. In 17th Int'l Parallel and Distributed Processing Symp. (IPDPS), April 2003.

[2] M. E. Acacio, J. Gonz'alez, J. M. Garc'ia, and J. Duato. A new scalable directory architecture for large-scale multiprocessors. In 7th Intl Symp. on High-Performance Computer Architecture (HPCA), pages 97-106, January 2001.

[3] S. V. Adve and K. Gharachorloo. Shared memory consistency models: A tutorial. IEEE Computer, 29(12):66-76, December 1996.

[4] A. Agarwal, R. Simoni, J. L. Hennessy, and M. A. Horowitz. An evaluation of directory schemes for cache coherence. In 15th Int'l Symp. on Computer Architecture (ISCA), pages 280-289, May 1988.

[5] N. Agarwal, T. Krishna, L.-S. Peh, and N. K. Jha. GARNET: A detailed on-chip network model inside a full-system simulator. In IEEE Int'l Symp. on Performance Analysis of Systems and Software (ISPASS), pages 33-42, April 2009.

[6] C. Bienia, S. Kumar, J. P. Singh, and K. Li. The PARSEC benchmark suite: Characterization and architectural impli-

[7] L. M. Censier and P. Feautrier. A new solution to coherence problems in multicache systems. IEEE Transactions on Computers, 27(12):1112-1118, December 1978.

[8] D. Chaiken, J. Kubiatowicz, and A. Agarwal. LimitLESS directories: A scalable cache coherence scheme. In 4th Int'l Conf. on Architectural Support for Programming Language and Operating Systems (ASPLOS), pages 224-234, April 1991.

[9] G. Chen. Slid—a cost-effective and scalable limited-directory scheme for cache coherence. In 5th Int'l Conference on Parallel Architectures and Languages Europe (PARLE), pages 341-352, June 1993.

[10] B. Choi, R. Komuravelli, H. Sung, R. Smolinski, N. Honarmand, S. V. Adve, V. S. Adve, N. P. Carter, and C.-T. Chou. DeNovo: Rethinking the memory hierarchy for disciplined parallelism. In 20th Int'l Conference on Parallel Architectures and Compilation Techniques (PACT), September 2011.

[11] B. Cuesta, A. Ros, M. E. G'omez, A. Robles, and J. Duato. Increasing the effectiveness of directory caches by deactivating coherence for private memory blocks. In 38th Int'l Symp. on Computer Architecture (ISCA), pages 93-103, June 2011.

[12] M. Ferdman, P. Lotfi-Kamran, K. Balet, and B. Falsafi. Cuckoo directory: A scalable directory for many-core systems. In 17th Int'l Symp. on High-Performance Computer Architecture (HPCA), pages 169-180, February 2011.

[13] J. R. Goodman. Using Cache Memory to Reduce Processor-Memory Traffic. In 10th Intl Symp. on Computer Architecture (ISCA), pages 124-131, June 1983.

[14] N. Hardavellas, M. Ferdman, B. Falsafi, and A. Ailamaki. Reactive NUCA: Near-optimal block placement and replication in distributed caches. In 36th Int'l Symp. on Computer Architecture (ISCA), pages 184-195, June 2009.

[15] H. Hossain, S. Dwarkadas, and M. C. Huang. POPS: Coherence protocol optimization for both private and shared data. In 20th Int'l Conference on Parallel Architectures and Compilation Techniques (PACT), September 2011.

[16] J. A. Kahle, M. N. Day, H. P. Hofstee, C. R. Johns, T. R. Maeurer, and D. Shippy. Introduction to the cell multiprocessor. IBM Journal of Research and Development, 49(4.5):589-604, July 2005.

[17] S. Kaxiras and G. Keramidas. SARC coherence: Scaling directory cache coherence in performance and power. IEEE Micro, 30(5):54-65, September 2011.

[18] D. Kim, J. A. J. Kim, and J. Huh. Subspace snooping: Filtering snoops with operating system support. In 19th Int'l Conference on Parallel Architectures and Compilation Techniques (PACT), pages 111-122, September 2010.

[19] A. R. Lebeck and D. A. Wood. Dynamic self-invalidation: Reducing coherence overhead in shared-memory multiprocessors. In 22nd Int'l Symp. on Computer Architecture (ISCA), pages 48-59, June 1995.

[20] Y. Li, A. Abousamra, R. Melhem, and A. K. Jones. Compiler-assisted data distribution for chip multiprocessors. In 19th Int'l Conference on Parallel Architectures and Compilation Techniques (PACT), pages 501-512, September 2010.

[21] E. Lindholm, J. Nickolls, S. Oberman, and J. Montrym. NVIDIA Tesla: A unified graphics and computing architecture. IEEE Micro, 28(2):39-55, March 2008.

[22] P. S. Magnusson, M. Christensson, and J. Eskilson, et al. Simics: A full system simulation platform. IEEE Computer, 35(2):50-58, February 2002.

[23] M. M. Martin, D. J. Sorin, and B. M. Beckmann, et al. Multifacet's general execution-driven multiprocessor simulatorc (GEMS) toolset. Computer Architecture News, 33(4):92-99, September 2005.

[24] A. Moshovos, G. Memik, B. Falsafi, and A. N. Choudhary. JETTY: Filtering snoops for reduced energy consumption in SMP servers. In 7th Int'l Symp. on High-Performance Computer Architecture (HPCA), pages 85-96, January 2001.

[25] N. Muralimanohar, R. Balasubramonian, and N. P. Jouppi. Cacti 6.0. Technical Report HPL-2009-85, HP Labs, April 2009.

[26] B. W. O'Krafka and A. R. Newton. An empirical evaluation of two memory-efficient directory methods. In 17th Intl Symp. on Computer Architecture (ISCA), pages 138-147, June 1990.

[27] J. M. Owen, M. D. Hummel, D. R. Meyer, and J. B. Keller. System and method of maintaining coherency in a distributed communication system. U.S. Pat. No. 7,069, 361, June 2006.

[28] S. H. Pugsley, J. B. Spjut, D. W. Nellans, and R. Balasubramonian. SWEL: Hardware cache coherence protocols to map shared data onto shared caches. In 19th Int'l Conference on Parallel Architectures and Compilation Techniques (PACT), pages 465-476, September 2010.

[29] B. Smith. Personal communication. October 2011.

[30] D. J. Sorin, M. D. Hill, and D. A. Wood. A Primer on Memory Consistency and Cache Coherence, volume 6 of Synthesis Lectures on Computer Architecture. Morgan & Claypool Publishers, May 2011.

[31] D. Vantrease, M. H. Lipasti, and N. Binkert. Atomic coherence: Leveraging nanophotonics to build race-free cache coherence protocols. In 17th Int'l Symp. on High-Performance Computer Architecture (HPCA), pages 132-143, February 2011.

[32] S. C. Woo, M. Ohara, E. Torrie, J. P. Singh, and A. Gupta. The SPLASH-2 programs: Characterization and methodological considerations. In 22nd Int'l Symp. on Computer Architecture (ISCA), pages 24-36, June 1995.

[33] H. Zhao, A. Shriraman, and S. Dwarkadas. SPACE: Sharing pattern-based directory coherence for multi-core scalability. In 19th Int'l Conference on Parallel Architectures and Compilation Techniques (PACT), pages —, September 2010.

What is claimed is:

1. A computer system comprising:
multiple processor cores;
a main memory;
at least one local cache memory associated with and operatively coupled to each core for storing cache lines accessible only by the associated core, each of the cache lines being classified as either a shared cache line or a private cache line; and
a global cache memory, the global cache memory being operatively coupled to the local cache memories and main memory and accessible by the cores, the global cache memory being capable of storing a plurality of cache lines, and wherein when a core writes a cache line, the core performs a write-back to the associated local cache memory if the cache line is a private cache line and a write-through to the global cache memory if the cache line is a shared cache line,
wherein at least one of the shared cache lines are in a valid state, an invalid state, or a transient dirty state, and wherein a shared cache line in a local cache memory transitions to the transient dirty state from the valid state or the invalid state when the cache line is written by the associated core, and wherein a shared cache line in the transient dirty state transitions to the valid state with a self-initiated write-through to the global cache memory.

2. The computer system of claim 1, wherein the self-initiated write-through to the global cache memory is arranged to occur at a period of time after the shared cache line transitions to the transient dirty state.

3. The computer system of claim 1, wherein a shared cache line which is in the valid state in a local cache memory associated with a first core transitions to the invalid state when a second core writes the shared cache line.

4. The computer system of claim 1, wherein each core transitions a subset of the shared cache lines in the associated local cache memories which are in the valid state to the invalid state before the core encounters a processing event.

5. The computer system of claim 4, wherein every shared cache line in the local cache memory which is in the transient dirty state is transitioned to either the invalid state or the valid state before the associated core encounters a processing event.

6. The computer system of claim 5, wherein the self-initiated write-through of a shared cache line in a local cache memory which is in the transient dirty state updates the global cache memory with only the data in the shared cache line that has been written by the associated core while the shared cache line is in the transient dirty state.

7. The computer system of claim 6, wherein the shared cache lines in the local cache memories are further classified into read-only cache lines and read-write cache lines, and wherein the shared read-only cache lines in a local cache memory which are in the valid state remain in the valid state when the associated core encounters a processing event.

8. The computer system of claim 7, wherein the processing event is a synchronization event.

9. The computer system of claim 5, wherein the shared cache lines in the local cache memories are further classified as read-only cache lines and read-write cache lines, and wherein the shared read-only cache lines in a local cache memory which are in the valid state remain in the valid state when the associated core encounters a processing event.

10. The computer system of claim 9, wherein the processing event is a synchronization event.

11. The computer system according to claim 1, wherein for a subset of core accesses to a shared cache line, the core bypasses the local cache memory and reads the shared cache line directly from the global cache memory.

12. The computer system of claim 11, wherein the shared cache line is blocked in the global cache memory while the core reads the shared cache line, and no request from another core can be processed by the global cache memory for the shared cache line until the shared cache line is unblocked by a write-through from the core.

13. The computer system according to claim 12, wherein the subset of the accesses of a core to a shared cache line are atomic instructions.

14. A method of implementing cache coherency in a computer system having multiple processor cores, the method comprising:
associating at least one local cache memory with each core for storing data accessible only by the associated core, the data being allocated to one or more cache lines acted upon by the associated core;
providing a global cache memory, the global cache memory being associated with each of the local cache memories for storing cache lines accessible by all of the cores;
classifying each of the cache lines in each local cache memory as a private cache line or a shared cache line;
performing a write-back operation to the associated local cache memory when a core writes a private cache line;
performing a write-through operation to the global cache memory when a core writes a shared cache line;
classifying at least one shared cache line to either an invalid state or a valid state;
changing the state of a shared cache line in a local cache memory to a transient dirty state, from either the valid or invalid state, when the shared cache line is written by the associated core; and
performing a self-initiated write-through of the shared cache line from the local cache memory to the global cache memory at a period of time after the shared cache line changes to the transient dirty state.

15. The method of claim 14, further comprising the steps of:
changing the state of any shared cache line in a local cache memory associated with a first core from the valid state to the invalid state when a second core writes the shared cache line to a local cache memory associated with the second core.

16. The method of claim 14, further comprising the steps of selecting one or more of the shared cache lines in a local cache memory which are in the valid state, and transitioning the selected shared cache lines to an invalid state before the core associated with the local cache memory encounters a processing event.

17. The method of claim 16, wherein the transitioning step further comprises selecting every shared cache line in the local cache memory in the transient dirty state and transitioning the selected shared cache lines from the transient dirty state to either the invalid state or the valid state before the core associated with the local cache memory encounters a processing event.

18. The method of claim 16, further comprising the steps of classifying the shared cache lines in each local cache memory as read-only cache lines or read-write cache lines, identifying a set of the shared read-only cache lines in each local cache memory which are in the valid state, and retaining the set of valid shared read-only cache lines in the valid state when the associated core encounters a processing event.

19. The method of claim 14, wherein the step of performing a self-initiated write-through of the shared cache line from the local cache memory to the global cache memory further comprises determining the data in the shared cache line modified by the associated core while the shared cache line is in the transient dirty state, and writing only the modified data in the shared cache line to the global cache memory.

20. The method of claim 19, further comprising the steps of classifying the shared cache lines in each local cache memory as read-only cache lines or read-write cache lines, identifying a set of the shared read-only cache lines in each local cache memory which are in the valid state, and retaining the set of valid shared read-only cache lines in the valid state when the associated core encounters a processing event.

21. The method of claim 14, wherein for a subset of core accesses to a shared cache line the core bypasses the local cache memory and reads the shared cache line directly from the global cache memory.

22. The computer system of claim 21, wherein the shared cache line is blocked in the global cache memory while the core reads the shared cache line, and no request from another core can be processed by the global cache memory for the shared cache line until the shared cache line is unblocked by a write-through.

23. The computer system according to claim 22, wherein the subset of core accesses to a shared cache line are atomic instructions.

24. A method of implementing cache coherency in a computer system having multiple processor cores, the method comprising:
- associating at least one local cache memory with each core for storing data accessible by the associated core, the data being allocated to one or more cache lines acted upon by the associated core, each cache line having either a valid state or an invalid state;
- providing a global cache memory, the global cache memory being associated with each of the local cache memories, the global cache memory storing data accessible by all of the cores, the data being allocated to one or more cache lines;
- classifying each of the cache lines as a private cache line or a shared cache line; and
- selecting between different write operations when a core writes a cache line, the selection including performing a write-back to the associated local cache memory when a core writes a private cache line and performing a write-through to the shared cache memory when a processor writes a shared cache line, and wherein the write-through operation can be delayed up to a synchronization event,
- wherein the shared cache line is blocked at the global cache memory during the write-through delay, allowing the core to repetitively write to the shared cache line during the delay, and wherein the shared cache line including all core writes is written through to the global cache memory at the end of the delay.

25. The method of claim 24, further comprising the steps of determining the data modified in the shared cache line by the core during the write-through delay, and writing-through to the global cache memory only the modified data in the shared cache line.

26. The method of claim 24, where the step of classifying the individual cache lines is performed by an operating system and includes designating the individual cache lines as private or shared at a page level using observed data accesses.

27. The method of claim 24, wherein the write-through of the shared cache line to the global cache memory occurs after a period of time starting after the first write by the core to the shared cache line.

* * * * *